Oct. 16, 1962     G. A. WALLACE     3,058,508
AUTOMOTIVE VEHICLE WHEEL

Filed May 6, 1960     2 Sheets-Sheet 1

*INVENTOR.*
George A. Wallace
BY
*Townsend and Townsend*
*attorneys*

Oct. 16, 1962  G. A. WALLACE  3,058,508
AUTOMOTIVE VEHICLE WHEEL
Filed May 6, 1960  2 Sheets-Sheet 2
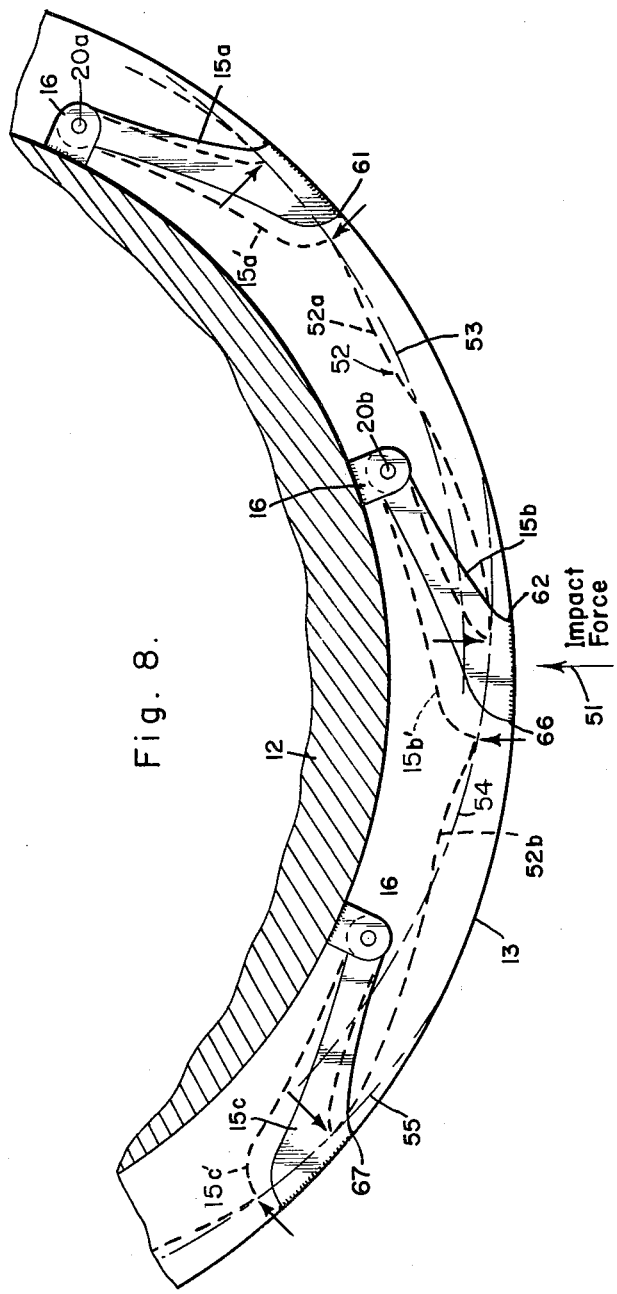
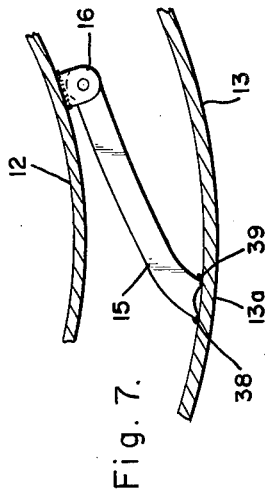
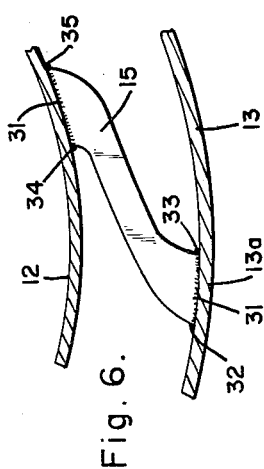
INVENTOR.
George A. Wallace
BY
Townsend and Townsend
Attorneys United States Patent Office 3,058,508
Patented Oct. 16, 1962

3,058,508
AUTOMOTIVE VEHICLE WHEEL
George A. Wallace, Rte. 1, Box 260, Morgan Hill, Calif.
Filed May 6, 1960, Ser. No. 27,302
13 Claims. (Cl. 152—5)

This invention relates generally to means for damping impact energy between cooperating parts and, more particularly, to means for connecting the hub and rim portions of a wheel to utilize the energy absorbing characteristics of the wheel components.

One of the main objects of the invention is to provide a wheel for automotive vehicles in which road shocks that cause tire wear and produce mechanical vibrations in the wheel supporting axles, bearings and driving connections will be greatly reduced.

Another broad object of the invention is to provide a wheel of new and novel construction for heavy duty loading which is efficient, practical, simple and inexpensive to manufacture.

This application is a continuation-in-part of application Serial No. 672,669, filed July 18, 1957, for Automotive Vehicle Wheel, now abandoned.

The problem of reducing the effect of road shock as it is transmitted through a wheel and rim structure to a vehicle axle has been attacked from many angles in the past. Most of the prior art techniques for seeking to dissipate road shock applied to the rim or hub flange of a wheel have used some form of interconnecting link between the two members. However, these links have uniformly been resilient and their distortion relied upon to absorb energy. For example, in Patent 2,697,467 issued to F. Giannotti on December 21, 1954, there is disclosed a number of links that are elongated spring elements. These are flexed when the vehicle wheel strikes a stone or other impact causing discontinuity in the rolling surface and thereby tend to reduce the transfer of the full force of the impact to the wheel supporting hub. A somewhat similar technique is exemplified in Patent 2,761,485 issued to G. Allen on September 4, 1956. The latter discloses and illustrates a plurality of resilient connecting links which are pivoted over fulcrum points located on the rim and hub flanges to absorb some of the energy applied to the rim flange by impact. Here again, it is the connecting links which are flexed to minimize energy transfer.

One of the shortcomings of these as well as other prior art efforts is inherent in the use of flexing connecting members to absorb energy. These links are necessarily short and therefore unable to deflect to any substantial extent in the limited space available between the rim and the hub flange. Since the energy absorption ability of any resilient member is limited by its effective length and the amount of bending, the order of energy absorption has never been as high as needed.

The present invention overcomes the basic defect in these types of suspension systems by transforming the entire rim and/or hub flange into an energy absorption link.

Therefore, another feature of the present invention is a spoke-like linkage between the hub and rim of a wheel which takes advantage of the inherent resiliency of the hub and rim of the wheel to cushion the impact forces traveling from the point of impact upon the rim to the axle upon which the wheel is mounted.

Another feature of the invention is a new and novel form of torque transmitting connection between the hub and rim of a wheel by which the resiliency of the hub and/or rim of the wheel are relied upon for the damping and/or the absorption of shocks due to the impacts which set up vibrations in the transmission system of a higher frequency than is readily absorbed by the tire and the spring suspension system of the vehicle.

Still another feature of the invention is a shock absorbing connection between the hub and rim of an automotive vehicle wheel in which the impact transmitted through a tire to the rim of the wheel will be transferred to an undulatory mode of the rim. A system of levers having fulcrum points that cooperate with the hub and/or rim to deflect portions thereof are employed with the result that the undulatory flexing of the wheel flanges absorb the impact forces that would otherwise be transmitted directly to the axle of the wheel.

More particularly, a feature of the invention pertains to the novel suspension means between the hub and rim of a wheel which utilizes the inherent resiliency of concentric portions of the hub and rim to absorb the initial forces of impact upon the wheel thereby to reduce the forces of impact delivered to the axle and permit a more efficient functioning of the suspension system between the axle and the vehicle itself. Not only is the effective length of the energy absorbing means extended by using the circumference of the rim and/or hub flange, but the number of flexing points is increased significantly by imparting an undulatory motion to the normally circular hub flange and rim.

These and other objects and features of the present invention will be more fully understood when the following detailed description is read with reference to the drawings, in which:

FIG. 6 is a side view of a third variation of a link connecting the rim to the hub flange in accordance with the present invention;

FIG. 7 is a fourth variation of a link connecting the rim to the hub flange in accordance with the present invention; and FIG. 8 is an enlarged partial side view of a rigid hub flange connected to the rim of a wheel by a plurality of links to illustrate the undulatory mode of a section of the rim when the concept of the present invention is employed.

Figure 1:
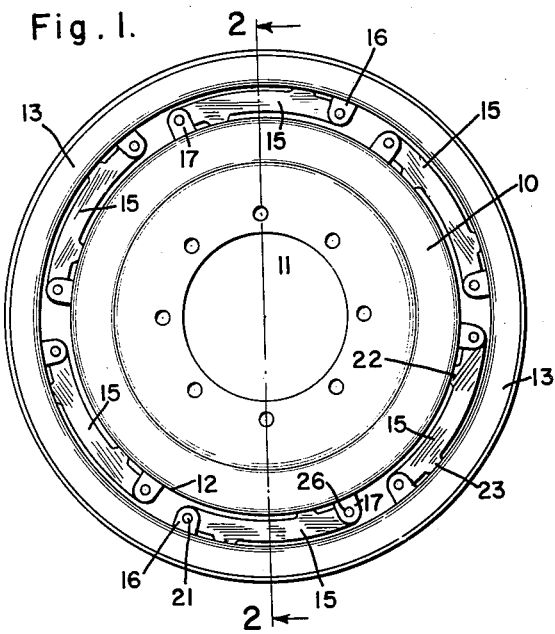
FIG. 1 is a side view of an assembled wheel showing one embodiment of the present invention.
Figure 2:
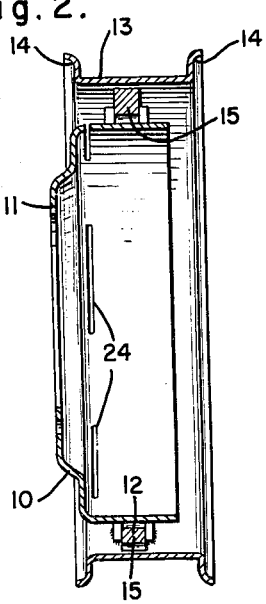
FIG. 2 is a vertical sectional view taken along line 2—2 of FIG. 1.

As pointed out above, the wheels constructed in accordance with the present invention have resilience and shock absorbing characteristics over and above those present when leaf spring spokes or coiled springs are employed. Instead of relying on leaf or coiled springs and/or like shock absorbing means between the hub and rim of a wheel, the present invention relies principally upon the inherent resiliency of a steel hub and rim of the wheel. As a substitute for radial spokes in the commonly accepted sense, the hub and rim of the present invention are connected together by a series of tangentially extending rigid torque transmitting links that are pivotally connected at their opposite ends between the hub and rim of the wheel and operate over fulcrum points along their inner and/or outer sides and inwardly therealong from said pivotal connections with the hub and rim of the wheel. With this arrangement, the torque transmitting links will be subject to tension and compression and the hub flange and the rim at the ends of the links will be deflected from a true circle to provide a spring-like action that effectively damps and/or absorbs road shocks that result in mechanical vibrations which would otherwise be transmitted to the axle and transmission of the vehicle.

The result is not just a simple deflection but deflection of a progressive degree both forward and rearward of the point of impact as the wheel rotates. As a consequence, the entire flange of the hub and the rim of the wheel become operative to cushion impacts.

The pivotally connected links or fulcrumed levers of the present invention are ordinarily designed and assembled between the hub and rim of the wheel so that they are biased to support a predetermined loading on the axle connected to the hub. This predetermined resistance to relative movement between the hub and the rim is necessary to provide the normal equilibrium condition for the vehicle, absent an impact shock. This biasing also increases the speed and frequency of response of the system to some extent.

For a more detailed description of the invention, reference is now made to the accompanying drawing wherein the numeral 10 designates a hub having an axle engaging face 11 and a resilient cylindrical flange 12 that extends concentrically into telescoping relation with a resilient tire supporting rim or rim flange 13 having suitable tire retaining means thereon. In accordance with one embodiment of the invention (FIG. 1), the resilient cylindrical flange 12 of the hub 10 is connected to the resilient cylindrical portion of the rim 13 by a system of rigid torque transmitting links 15, here shown as six in number. It will be understood, however, that the number and lengths of these links may be varied and will depend upon the construction and resilience of the hub flange 12 and the rim flange 13. The links 15 are of substantially rigid construction in that they have no predisposed flexibility, i.e. they are relatively stiffer than the rim and hub flange. Thus, to provide for flexibility or shock absorbing characteristics in the wheel, the hub 10 and the rim 13 are of resilient material, such as a mild steel.

The hub 10 and the rim 13 of the wheel are secured in functional relation by six equally spaced links 15 which pivotally engage clips 16 at one end of links 15 and clips 17 at the other ends of the links 15. In this manner, the hub 10 and the rim 13 are held against relative circumferential displacement by the rigid links 15. Links 15 may also be secured at their ends to the hub flange 12 and to the concentric cylindrical portion of the rim 13 by various means, some of which are illustrated in other figures discussed below.

Figure 3:
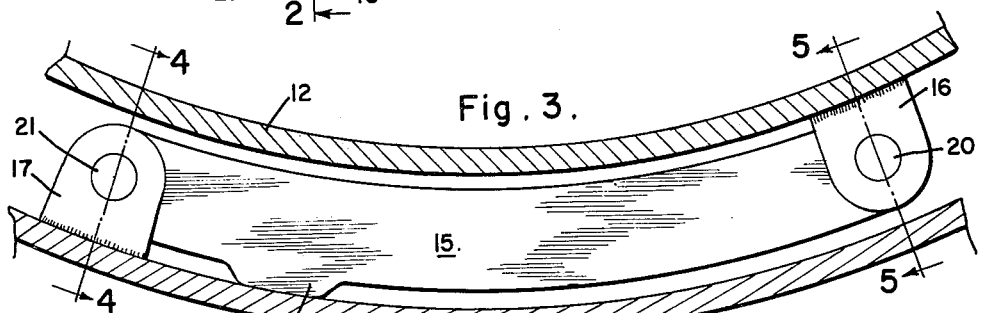
FIG. 3 is an enlarged side view of a variation of the link illustrated in FIG. 1 as it cooperates with a part of the rim and hub flange.

In the first and second embodiments of FIGS. 1 and 3, respectively, however, clips 16 and 17 are shown as having base portions that are welded in spaced relation directly to the hub and rim of the wheel. For ease of assembly, the clips 16 and 17, respectively, have spaced upstanding ears 18 and 19 between which the corresponding ends of the links 15 are secured by pins 20 and 21. In these two variations of the links 15, they are shown as having one or more bearing surfaces or protuberances 22, 23. The bearing surface or protuberance 22, when present, engages with the cylindrical flange 12 of the hub 10 at a point inwardly therealong from its point of connection. The protuberance 23 engages the cylindrical portion of the rim 13 at a point inwardly from its point of connection.

FIG. 3 of the drawing shows the interrelation of fulcrum point 23 and the rim 13 more clearly. However, it is to be noted that the variation illustrated in FIG. 3 has omitted the fulcrum or projection 22. With this latter modification, it will be appreciated that by retaining only protuberance 23 upon each of the links 15, the shocks imposed upon the wheel on impact at any point will be absorbed principally by deflection of the rim or rim flange 13. If protuberance 23 is omitted and protuberance 22 retained (a situation not illustrated), the shocks due to impact will be absorbed by the hub flange 12 of the wheel.

Figure 4:
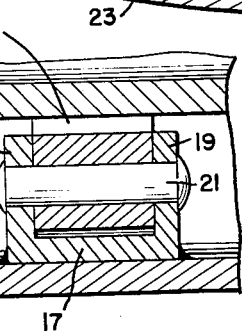
FIG. 4 is a cross section view taken along line 4—4 of FIG. 3.
Figure 5:
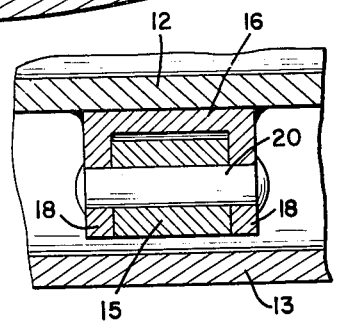
FIG. 5 is a cross section view taken along line 5—5 of FIG. 3.

As indicated in FIGS. 4 and 5 of the drawings, the links 15 fit snugly between the ears 18 upon the clips 16 and the ears 19 upon the clips 17, and with the tight fitting pins 20 and 21, employed respectively at these ends of the links, the hub 10 and the rim 13 are held in operative co-planar relation.

Before describing the way in which the interconnecting links of the present invention cooperate to warp the hub flange and/or the rim of a wheel to obtain the objects of the present invention, it is desirable to consider the different embodiments of the rigid connecting links illustrated in FIGS. 6 and 7. FIG. 6 illustrates another way in which connecting links 15 may be connected between the hub flange 12 and rim flange 13. It will be noted there that the link 15 is welded along the full width of its ends 31 to the flanges 12 and 13. This rigid connection of the link 15 will operate satisfactorily; however, the effective point of connection of the link 15 to the rim 13 will be at 32 and the equivalent fulcrum point will fall at 33 (as compared to embodiments of FIGS. 1 and 3). In a similar manner, the effective fulcrum point for the link 15 adjacent hub flange 12 will be at 34 and the effective point of connection at 35.

The rigid arrangement illustrated in FIG. 6, when an impact force is delivered to the rim flange 13 for example, tends to pivot the flange 15 about points 32 and 35 with the pivot points being 33 and 34, respectively.

Yet another configuration of a connecting link is illustrated in FIG. 7 where pivoted clip 16 connects the link 15 to the hub flange 12 and the other end of link 15 is connected to the rim flange at points 38 and 39 by welding or some other permanent means. In this case, if a force strikes flange 13, attachment point 38 acts as the support for the link 15 and attachment point 39 acts as the fulcrum point.

In the embodiments illustrated in both FIGS. 6 and 7, the warping effect employed to deform the rim and/or hub flanges into undulating shapes is present. However, when the fulcrum point is rigidly fixed to a cooperating member rather than merely bearing against it, as in the embodiments of FIGS. 1 and 3, the portion of the rim flange 13a is rendered inflexible which, in turn, reduces the effective resiliency of the overall rim and/or hub flange to some extent.

The basic requirement, irrespective of the way in which the links 15 and the hub and rim flanges 12 and 13 are connected, is that an effective fulcrum point be provided on the link which is a discrete distance removed from the effective attachment point of the link to the flange and in a generally co-planar direction. In other words, a sole point contact connection between a link 15 and its cooperating flange member 12 or 13 will not permit the link to act as a relatively non-resilient lever which is pivoted to deflect the flange cooperating with it. It is perfectly possible, within the concept of the present invention, however, to provide one fulcrum point which cooperates with only one of the connecting flanges. But at least one fulcrum point co-planarly removed from the point of attachment of the connected link is mandatory. Whether the attachment and fulcrum points are provided at leading and trailing edges of a welded bead, by point contacts, by one bead contact and a fulcrum projection, or by a pivoted connection with a fulcrum projection is immaterial from the standpoint of the basic concept.

One explanation of the way in which the rigid links connected between a hub and rim flange in accordance with the inventive concept described herein interact to warp the rim and/or hub flange may be expanded upon with reference to FIG. 8. It should be noted that it is not certain that this explanation is entirely correct. However, it appears to offer a reasonable explanation of the phenomena that results in such improved results of the present invention as compared to prior art arrangements. FIG. 8 illustrates a portion of a hub and rim flange cooperating with a plurality of rigid connecting links pivotally connected to the hub flange and welded along the length of their other ends to the rim flange. In setting forth the following explanation of the effect of an impact force on the structure, it is assumed that the hub flange 12 is extremely heavy as compared to the rim flange so that little or no warping or flexing of the hub flange 12 will occur. This is also assured by pivoting the connecting links 15 to the hub flange 12 and omitting a fulcrum point.

If an impact force 51 is applied to the outer periphery of the rim flange 13 and the flange is interconnected to the hub flange as illustrated, the rim 13 will deform in the shape of the undulating mode illustrated by dotted line 52. In order to understand why this occurs, consider first that the only point of attachment between the rim and the hub flange is connecting link 15a. When impact force 51 is applied to the rim 13, it will move upward to the position illustrated by the phantom line 53 with the link assuming the position 15a' as defined by the radius about 20a. However, the rim is not free to lie along the arcuate line 53 since link 15b resists upward displacement of the rim 13. Since the natural tendency of rim 13 is to be displaced upward to arcuate line 53 and link 15b resists this upward movement by pivoting about 20b, a compromise occurs and the link 15b is rotatably displaced about its pivot point 20b to the point where the welded end of the rim (of link 15b) lies along the arcuate path 54. This path is intermediate the equilibrium positions of rim 13 and link 15b shown in full lines and the arcuate position 53 which it would assume absent restricting link 15b. Because the discrete lengths of rim 13 attached to rigid links 15a and 15b have been pivoted about pivot points 20a and 20b to lie in different planes 53 and 54, a warping stress is applied to the intermediate part 52a of the rim 13 with the results illustrated by dotted line 52.

As can be appreciated from examining the displaced links 15a' and 15b' of FIG. 8, the displacement of a link tends to create a clockwise moment about the section of the rim 13 to which the link is connected (illustrated by the small arrows). Since the forces at point 61 of link 15a and 62 of link 15b are in opposition, they act as a moment to warp the portion of the rim 13 between these two points with the result that undulatory mode 52a is established. The reversal of the deflection occurs because the resilient portion of the rim seeks to minimize its angular departure from the planes 53 and 54 fixed by links 15a and 15b. In so minimizing the departure, it reverses the bend to establish an undulatory shape in the connecting portion of the rim 13.

Link 15b interacts with link 15c in a manner similar to the interaction between links 15a and 15b to warp the rim flange 13 between links 15b and 15c. It will be remembered that the normal unstressed position of the rim 13 after link 15b has been displaced to the dotted position 15b' is along arcuate line 54. However, link 15c is present to resist such an extreme movement of the rim 13 at that point with the result that an equilibrium position 15c' is reached intermediate the normal or equilibrium position of the rim 13 and its assumed position along arcuate path 54 if link 15c were not present. As a result of this and, since the section 52b of rim 13 between the connecting point 66 of link 15b and the fulcrum point 67 of link 15c will seek to minimize the angular departure from arcuate paths 54 and 55 to which it is restricted, it will assume the warp shape or undulatory mode illustrated.

In a similar manner, the interaction of link 15c and the next link around the periphery of the wheel cooperate. Finally, the link next above link 15a cooperates with link 15a to define its position heretofore assumed along 53. Thus, it can be seen that the links 15 which are disposed around the periphery of the hub flange 12 and are interconnected to the rim 13 act to create a series of lever type actions to transfer any impact force such as 51 along the full length of the rim flange 13 with the resulting dissipation of energy.

Since the warped rim is in a constant state of disequilibrium until the full energy of the impact force 51 is absorbed, the rim flexes into and out of the reverse bends as the moments established by the original displacement seek to return it to equilibrium. As a pendulum slowly pivots about its equilibrium position, so does the instant rim structure. Naturally, if the hub flange 12 had a fulcrum point cooperating with it, the impact force 51 would also act to establish a complex undulatory shape of the flange 12, somewhat similar to that established with respect to rim 13. In this case then, the effective length of the energy absorption medium is substantially increased over the use of the rim alone.

While it has been found that under some conditions the cylindrical flange 12 of the hub 10 may possess sufficient resilience to respond to impact transmitted thereto through the connecting links 15 in the manner above described, under other conditions it may prove advantageous to provide the hub flange 12 with a series of circumferentially spaced slots 24 that extend around the hub 10 and thus separate the cylindrical flange 12 of the hub 10 from its axle engaging face 11 in the zones where the links 15 are connected. In this manner, a portion of the cylindrical flange 12 will be rendered free to flex independently of the axle engaging face 11 of the hub 10. By varying the circumferential length and the arrangement of these slots 24, it will be possible to provide for any desired additional degree of shock absorbing resilience in the hub 10 of the wheel.

It is significant to note that the particular arrangement in forcing reversing or undulatory bending of the rim and/or hub flanges in effect doubles the number of points around the periphery of a flange which are flexed as compared to the actual physical points of attachment between the links and the flange members. Thus, the energy absorbing characteristic of the resilient members is materially amplified without increasing the points of physical attachment between the hub flange and the rim.

Applying the foregoing concept to the present structure, with an equilibrium condition obtaining, additional external forces must be applied before any relative deflection between the rim and the hub flange occur. When such an external force is applied, as for example 51, the rim in the area of impact is deflected inwardly, i.e., toward the center of the hub and rim, which sets into motion the forces as described in connection with FIG. 8. The interconnections described above act to dissipate the impact energy much as a pebble dropped into a pool of water creates ever widening but smaller magnitude wave fronts. Thus, the warping of the rim and hub flange is greatest most closely adjacent the point of impact but with the back wash of energy absorption being transmitted around the rim to the portion furthest removed from the point of impact.

The alternate flexure of the rim and/or hub flange provides an efficient energy dissipating medium which is increasingly efficient as the magnitude of the impact forces increases, at least up to the point of stress failure of the resilient hub and rim flanges. While the present invention has been described in some detail with respect to specific embodiments, it should be apparent to those skilled in the art that various other arrangements of parts may be perceived which will utilize the inventive concept of the present invention. Thus, any cooperative arrangement between interconnecting parts wherein relatively more rigid connecting means are provided to deflect the members to which they are connected so that the members become the principal energy dissipative medium, and not the connecting links, is within the teaching of the present invention. For this reason, the invention should not be limited except to the extent of the appended claims.

What is claimed is:

1. Apparatus for utilizing the energy absorption properties of at least one of a plurality of interconnected parts to minimize the effect of an external impact on one as it is transferred to the other comprising, in combination, first and second resilient members disposed in spaced relation to each other, and a plurality of rigid links connecting said first and second members together, said links and said cooperating members proportioned so that the links deflect at least one of said members in an undulatory mode whereby it absorbs a substantial part of the energy of any external force applied to one of said members.

2. Apparatus for utilizing the energy absorption properties of at least one of interconnected resilient parts to minimize the effect of an impact on one upon the other comprising, in combination, first and second resilient members disposed in spaced relation to each other, and a plurality of rigid links interconnecting said members with at least one fulcrum point on each of said links cooperating with one of said members so that each link pivots to deflect the member cooperating with its fulcrum point to cause it to absorb a substantial part of the energy of impact.

3. Means for utilizing the energy absorption characteristics of the hub flange and the rim of a wheel to reduce the effect of an impact on one of the parts as it may be transferred to the other comprising, in combination, a hub having a cylindrical flange thereon, a rim flange arranged concentrically about said hub flange, and a plurality of rigid links connecting said flanges, each one of said links having at least one fulcrum point intermediate its points of connection so that it pivots to deflect the flange cooperating therewith so that said flange dissipates energy throughout the circumference of the wheel upon the application of an impact force at any point about the wheel.

4. Means for utilizing the energy absorption characteristics of the hub flange and the rim of a wheel to reduce the effect of an impact on one of the parts as it may be transferred to the other comprising, in combination, a hub having a cylindrical flange thereon, a rim flange arranged concentrically about said hub flange, and a plurality of rigid links interconnecting said flanges and extending substantially tangential to the outer surface of said hub, each one of said links having at least one fulcrum point intermediate its outermost points of connection to said rim and hub so that it pivots to deflect the flange cooperating therewith so that said flange dissipates energy throughout the circumference of the wheel upon the application of an impact force at any point about the wheel.

5. Means for utilizing the energy absorption characteristics of the hub flange and the rim of a wheel to reduce the effect of an impact on one of the parts as it may be transferred to the other in accordance with claim 4 wherein at least one end of each of said links is pivotally connected to its associated flange.

6. Means for utilizing the energy absorption characteristics of the hub flange and the rim of a wheel to reduce the effect of an impact on one of the parts as it may be transferred to the other in accordance with claim 4 wherein at least one end of each of said links is rigidly attached to said flanges at peripherally displaced points, one of which acts as the fulcrum point for the attached flange.

7. Means for utilizing the energy absorption characteristics of the hub flange and the rim of a wheel to reduce the effect of an impact on one of the parts as it may be transferred to the other comprising, in combination, a resilient hub having a cylindrical flange thereon, a resilient rim flange arranged concentrically about said hub flange, and a plurality of rigid links extending substantially tangential to the outer surface of said hub and rigidly connected in spaced relation to said flanges along arcuate lengths about their peripheries so that the flanges dissipate energy throughout the circumference of the wheel upon the application of an impact force at any point about the wheel.

8. Means for utilizing the energy absorption characteristics of the hub flange and the rim of a wheel to reduce the effect of an impact on one of the parts as it may be transferred to the other comprising, in combination, a resilient hub having a cylindrical flange thereon, a resilient rim flange arranged concentrically about said hub flange and co-planar therewith, and a plurality of rigid links extending substantially tangential to the outer surface of said hub flange and rigidly connected in spaced co-planar relation to said rim along arcuate lengths so that said rim dissipates energy throughout its circumference upon the application of an impact force at any point about the wheel.

9. An automotive vehicle wheel, comprising a hub having a cylindrical flange and outwardly spaced concentrically arranged rim upon which a tire may be mounted, characterized by the fact that the cylindrical flange of said hub and the rim of said wheel are connected by a system of rigid links having fulcrum points on opposite sides engaging the hub flange and the rim of the wheel at points adjacent and inwardly from the outermost points of their connection to said hub flange and rim whereby in addition to transmitting torque said links will operate as non-flexing levers about said fulcrum points to deflect said hub flange and said rim in absorbing road shocks and, due to the resilience of said hub flange and said rim, augment deflections of the hub flange and rim throughout the circumference of the wheel upon impact at any point about the wheel.

10. An automotive vehicle wheel, comprising a hub having a resilient cylindrical flange and outwardly spaced concentrically arranged rim upon which a tire may be mounted, characterized by the fact that the resilient cylindrical flange of said hub and the rim of said wheel are connected by a system of rigid links disposed between said hub flange and rim, each having a protuberance forming a fulcrum point engaging the rim of said wheel at points adjacent their connection to said rim flange whereby in addition to transmitting torque from the hub to the rim of said wheel said links act as levers about said fulcrum points to deflect said rim in absorbing road shocks and, due to the resilience of said rim, augment deflections of the rim throughout the circumference of the wheel upon impact at any one point about the wheel.

11. In an automobile vehicle wheel, the combination of a metallic rim having a resilient cylindrical portion with pneumatic tire retaining means, a hub having an axle engaging face and a resilient cylindrical flange disposed in spaced telescoping relation within said rim, a plurality of inwardly extending pivot forming clips secured in spaced relation about the inner surface of said rim, a plurality of similar pivot forming clips secured to and extending in spaced relation from the outer surface of said hub and displaced circumferentially with respect to the clips upon said rim, and a plurality of rigid connecting links pivotally secured at their ends between successive pairs of said clips and extending substantially tangent to the circumference of said hub flange, and means extending from opposite sides of said links engaging the opposed surfaces of said rim and hub flange at points adjacent said clips, whereby said hub flange and said rim will be subjected to deflections at the ends of said links when absorbing any shock caused by impact upon the wheel at any point thereAround.

12. In an automotive vehicle wheel, the combination of a metallic rim having a cylindrical portion with pneumatic tire retaining means, a hub having an axle engaging face and a cylindrical flange disposed in spaced telescoping relation within said rim, a plurality of inwardly extending clips secured in spaced relation about the inner surface of said rim, and a plurality of rigid connecting links secured at their inner ends to said hub flange and at their outer ends to said clips upon said rim and extending substantially tangent to the circumference of said hub, and means extending from the outer side of said links engaging the inner surface of said rim at points adjacent said clips, whereby said rim will be subjected to deflections at the ends of said links when absorbing any shocks caused by impact upon the wheel at any point therearound.

13. An automotive vehicle wheel, comprising a hub having a cylindrical flange and an outwardly spaced concentrically arranged rim upon which a tire may be mounted, characterized by the fact that the cylindrical flange of said hub and the rim of said wheel are connected by a system of rigid links disposed in the plane of and between said hub flange and said rim having protuberances engaging the rim of the wheel at points adjacent to and inwardly from their points of connection to said rim, whereby in addition to transmitting torque from the hub to the rim of said wheel said links will operate as levers about said protuberances as fulcrum points to deflect said rim in absorbing road shocks and due to the deflection of said rim augment deflections of the rim throughout the circumference of the wheel upon impact at any one point about the wheel.

References Cited in the file of this patent

UNITED STATES PATENTS

| | | |
|---|---|---|
| 2,628,651 | Gilbert | Feb. 12, 1953 |
| 2,660,213 | Gilbert | Nov. 24, 1953 |
| 2,916,329 | Gilbert | Dec. 8, 1959 |